Jan. 15, 1963   F. BRONSTERT   3,072,984
STORAGE CELL ELEMENT CONNECTING STRAP
AND METHOD FOR ITS PRODUCTION
Filed Sept. 15, 1959                          2 Sheets-Sheet 1

INVENTOR:
FRANZ BRONSTERT

By

AGENT

Jan. 15, 1963

F. BRONSTERT 3,072,984

STORAGE CELL ELEMENT CONNECTING STRAP
AND METHOD FOR ITS PRODUCTION

Filed Sept. 15, 1959

INVENTOR.
FRANZ BRONSTERT

BY

AGENT

_United States Patent Office_

3,072,984
Patented Jan. 15, 1963

3,072,984
STORAGE CELL ELEMENT CONNECTING STRAP AND METHOD FOR ITS PRODUCTION
Franz Bronstert, Bad Homburg vor der Hohe, Germany, assignor to Varta Aktiengesellschaft, Frankfurt am Main, Germany, a corporation of Germany
Filed Sept. 15, 1959, Ser. No. 840,179
5 Claims. (Cl. 22—210)

The present invention relates to the manufacture of a connecting strap between the electrodes of the same polarity of a storage cell element and to such a connecting strap.

As is known, cells of storage batteries contain elements of intermeshed groups of positive and negative plates, the plates of each polarity being electrically and mechanically connected by straps or rods interconnecting lugs projecting from one side of the plates. A pillar post extends from each strap to form a positive and a negative pole, respectively.

Various ways of producing connecting straps for storage cell elements have been proposed. For instance, suitably shaped connecting straps have been cast of a lead-antimony alloy and the cast piece was provided with recesses or slots to receive the lugs of the battery plates to be connected. After the groups of positive and negative plates have been connected by separate straps, the assembled groups are intermeshed to form the cell element, separators having been placed between the plates in a manner well known per se. Alternatively, the alternating positive and negative plates were assembled with their interleaved separators and the cast connecting straps were then placed on the lugs of the plates. The lugs were then welded to the connecting straps by a lead-burning or soldering process.

It has also been proposed to produce the connecting straps directly by lead-burning or soldering. In this process, the lugs of the assembled groups of plates are placed into a suitable mold or form and a suitable lead alloy is burned from a burning rod into the cavity of the form around the lugs to form the strap. The pillar posts must still be cast separately and then welded to the strap. Alternatively and in a more complicated process, a suitable form may be placed upon the connecting strap, after it has been formed, and a suitable lead alloy is again burned into the latter form to produce the pillar post on the strap.

Instead of the lead burning, it has also been suggested to cast the lead alloy directly into such forms although a lead-burning flame is often used in this process to help produce a good connection between the plate lugs.

All of these methods have a great number of serious disadvantages. Lead-burning is a highly specialized art and can be effectively handled only by workers of a high order of skill. Proper mechanical and electrical connection of the plate lugs requires the most meticulous attention in each instance and even then, lead-burning quite frequently gives unsatisfactory results. In addition, all the prior methods of manufacture are very time-consuming and none makes an accurately controlled heat elimination possible. Therefore, the heat often causes breaks in the plate lugs.

Furthermore, lead-burning produces only flat-surfaced connecting straps, i.e. straps without reinforcing ribs, and lead-burnt straps are not accurate. The relatively rough surface of such straps is unsightly and porous spots therein may cause corrosion, particularly when the connecting strap is positioned outside the electrolyte liquid. Reinforcing ribs, which are very desirable to increase the rigidity of the connecting straps, cannot be produced with lead-burning, except possibly by complicated and difficult welding operations.

In known storage cell elements, the pillar posts are positioned laterally of the connecting straps because lead-burning is effected from above and locating the posts in the middle of the straps in vertical alignment therewith would hinder the welding operation. However, placing the pillar post centrally of the connecting strap is desirable to obtain the shortest path for the electric current and to save lead.

It is the primary object of the present invention to overcome the above disadvantages and to provide a greatly improved storage cell element connecting strap and method of manufacture.

In accordance with this invention, the aligned lugs of a group of storage cell plates are immersed into a bath of liquid lead provided in an open cavity of a mold, the configuration of the cavity conforming to the desired shape of the connecting strap and preferably the pillar post, and the melting processes in the vicinity of the lugs and the cooling conditions of the formed strap are closely controlled, the factors influencing these processes and conditions being readily determined empirically. Upon removal of the cooled mass from the mold, the connecting strap and the lugs form an integral unit, and if the cavity contains a recess defining a pillar post, the latter also forms an integral part of the assembly.

Preferably, the mold cavity also contains suitable recesses defining reinforcing ribs for the connecting strap.

The connecting strap of the present invention and its method of manufacture will be more fully understood from the following detailed description of certain preferred embodiments thereof, taken in conjunction with the accompanying drawing wherein FIG. 1 is a partial perspective view of a storage cell element;

Figure 1:
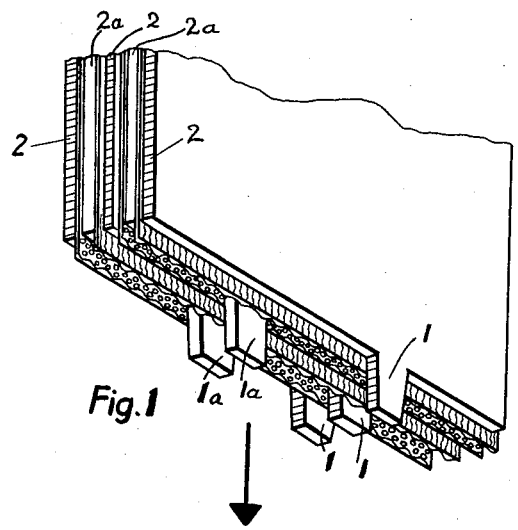

Referring now to the drawing, FIG. 1 shows two groups of intermeshing electrode plates 2 and 2a of a lead-acid battery element, plates 2 being provided with aligned lugs 1 while plates 2a have aligned lugs 1a. Separators 7 are interleaved between adjacent electrode plates of opposite polarity to form a storage cell element in the conventional manner.

Figure 2:
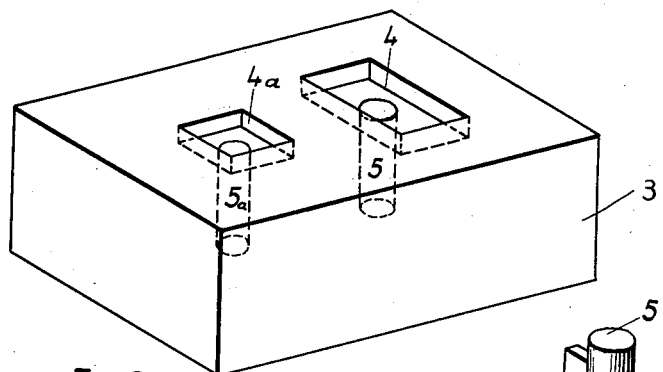
FIG. 2 is a perspective view of one embodiment of a suitable mold for producing the connecting strap.

As shown in FIG. 2, the connecting straps or bars for the plate lugs are produced in a form 3 provided with suitable cavities 4 and 4a of the shape desired for the straps. The mold cavities are open on top to enable the lugs 1 and 1a to be moved into the cavities, as shown by the arrow between FIGS. 1 and 2. Obviously, this movement may be effected either by moving the lugs downwardly into the cavities or by moving the mold 3 upwardly until the lugs project into the cavities.

In the illustrated embodiment, cylindrical cavities 5 and 5a extend, respectively, from cavities 4 and 4a to produce pillar posts integral with each connecting strap.

Figure 3:
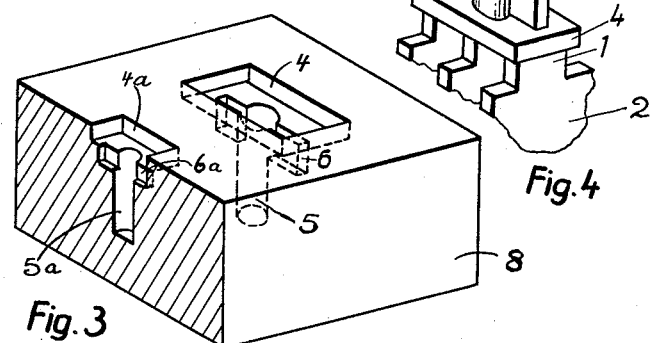
FIG. 3 is a similar perspective view, partly in section, of another embodiment of a mold.

The mold 8 of FIG. 3 is substantially identical with that of FIG. 2, except for the provision of additional recesses 6 and 6a for the formation of suitable reinforcing ribs on the connecting strap.

Figure 4:
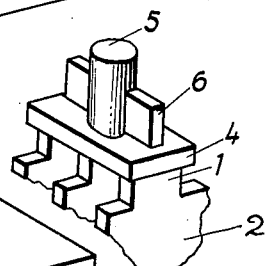
FIG. 4 is a perspective view showing the integrally formed lugs, connecting strap, reinforcing ribs therefor, and a pillar post.

The partial view of FIG. 4 shows a finished cell element formed in mold 8, wherein the connecting strap or bar 4 is integral with lugs 1 and has integrally formed thereon reinforcing ribs 6 and pillar post 5.

The strap with its reinforcing ribs and post is formed and united with the lugs by placing liquid lead into the mold cavities, immersing the lugs in the liquid lead, permitting the lead to cool and removing the unit from the mold.

Throughout the specification and claims, the term "liquid lead" refers to pure lead as well as suitable lead-antimony alloys such as conventionally used in the storage battery art for the production of connecting straps and/or posts.

According to the invention, an accurately determined amount of liquid lead at a predetermined temperature is placed into the mold cavities before the lugs are immersed therein. Furthermore, the immersion time and the progressive immersion of successive portions of the lugs are so controlled that the immersion speed is not constant but decreases from a very rapid initial movement to a minimal speed of immersion at the end.

The curve of immersion speed may be determined empirically according to the requirements for the most favorable cooling conditions in dependence on the type of mold used. Good results have been obtained with an immersion speed curve approximating an $e$-function.

When the empirically determined value for the temperature of the mold and the liquid as well as the immersion speed and the cooling speed are maintained by suitable control, the connection between the strap and the lugs is absolutely uniform and of the highest quality.

Figure 5:
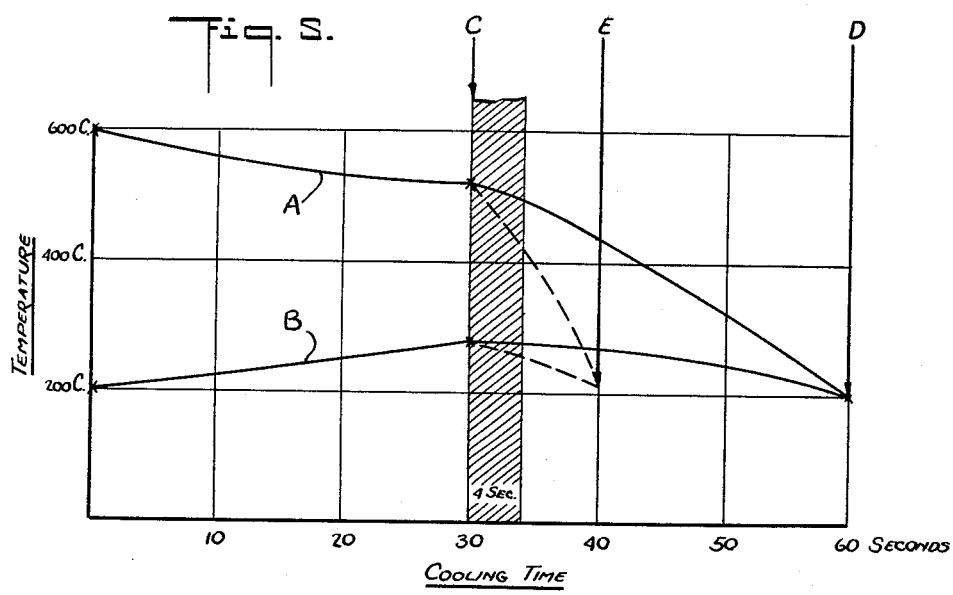
FIG. 5 is a temperature-time graph illustrating the process.
Figure 6:
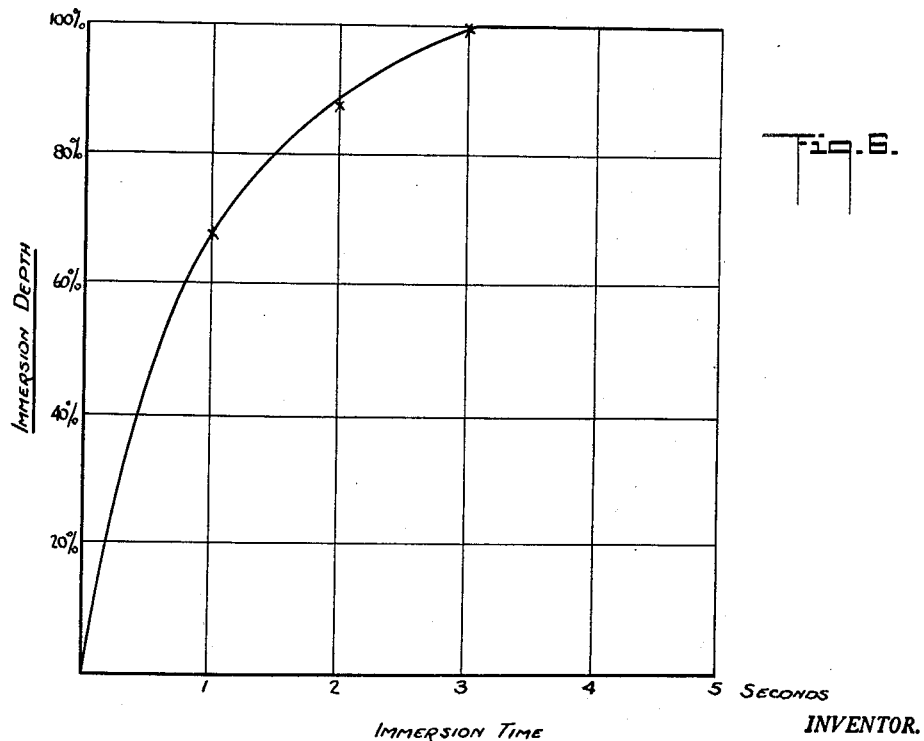
FIG. 6 is another graph illustrating the immersion cycle.

In the graph of FIG. 5, the time in seconds is plotted against the temperature in centigrades in a typical procedure according to the invention. As shown in curve A, lead at the temperature of 600° C. is poured into a form of cast iron or steel having a temperature of 200° C. Curve B shows that, after 30 seconds, the temperature of the form has risen to 280° C. while the molten lead has cooled to a temperature of 520° C. At this point (arrow C), the lugs are immersed in the molten lead at the rate shown in FIG. 6, i.e. 68% of the total immersion depth in the first second, 19% of the total depth in the second second and 13% of the total depth in the third second, the immersion curve following that of the $e$-function. In this manner, the largest portion of the lugs is immersed and melts in the hot lead of 520° C. and produces a very strong connection with the remaining lug portion and the newly produced strap before cooling.

If the form is not cooled, the lugs remain immersed for about 30 seconds, at which point (arrow D) the lead and the form have a temperature of about 200° C. and the lead has become rigid so that the cast piece may be removed. If the form is air- or water-cooled, the cast piece may be removed after about 10–12 seconds as shown by the broken-line curves A and B (arrow E).

Temperatures and cooling will, of course, depend on the heat conductivity of the form material. Also, if it is desired to reduce the immersion time, the initial temperatures of the mold and the molten lead must be somewhat lowered before immersion while they would have to be increased with longer immersion times.

Under the preferred conditions shown in the graphs and at an immersion temperature of 520° C., the amount of the immersed lug material is about 1/10 of the lead provided for the connecting strap. Thus, in the following Example 1, the amount of the immersed lugs is about 25 g. of lead. If the latter amount substantially exceeds 10% of the connecting strap, it is necessary either to use more molten lead of an initial temperature of 600° C. or the immerson speed must be increased.

The following examples illustrate the manufacture of a storage cell element with four positive plates:

*Example 1*

220 g. of liquid lead having a temperature of 600° C. were placed in cavity 4 of mold 3 which was at a temperature of 200° C. As soon as the temperature of the lead decreased to 520° C., the four lugs of the group of positive plates were immersed therein to a total depth of 10 mm. The immersion proceeded in the following manner: 6.8 mm. in the first second, 1.9 mm. in the next second, and 1.3 mm. in the third second, i.e. approximately along an $e$-function.

*Example 2*

The same procedure was followed when it was desired to provide reinforcing ribs for the connecting strap. In this case, the lugs were immersed in the cavity of mold 8 with its recess 6, 240 g. of liquid lead being used in this case.

As will be seen from the above description, the formation of centrally positioned pillar posts integral with the connecting straps is readily obtained by the method of the present invention, as is the formation of reinforcing ribs. Furthermore, the work may be fully automated and is completely independent from the skill of the individual operator.

While the invention has been specifically described in connection with certain preferred embodiments thereof, it will be clearly understood that many modifications and variations may occur to the skilled in the art, particularly after benefiting from the present teaching, without departing from its spirit and scope as defined in the appended claims.

I claim:

1. A method of manufacturing a connecting strap between lugs of a group of storage cell plates or like polarity, the steps which comprise introducing into an open cavity of a mold an accurately predetermined amount of liquid lead at a predetermined temperature, subsequently immersing the lugs in said liquid lead, controlling the immersion time and the progressive immersion of successive portions of the lugs so that the immersion speed decreases from a rapid initial movement to a minimal speed of immersion at the end, the length of the immersion path per time unit being a function of the length of the time unit and the immersion speed curve at least approximating the line of an $e$-function, permitting the lead in the cavity to cool, and removing the cooled assembly from the mold.

2. The method of claim 1, wherein the lugs are immersed into the open cavity of the mold by holding the one in a fixed position while the other is moved toward said fixed position.

3. The method of claim 1, wherein the mold is cooled with a cooling medium to cool the lead in the cavity.

4. The method of claim 1, wherein 68% of the total immersion depth is traversed by the lugs in the first second of immersion, 19% of the total immersion depth in the second second and 13% of the total immersion depth in the third second.

5. The method of claim 1, wherein the immersed material of the lugs does not exceed about 1/10 of the liquid lead wherein it is immersed.

References Cited in the file of this patent

UNITED STATES PATENTS

| 151,218 | Grasser | May 26, 1874 |
| 2,737,542 | Shannon et al. | Mar. 6, 1956 |
| 2,886,622 | Shannon | May 12, 1959 |

FOREIGN PATENTS

| 23,315 | Australia | May 14, 1930 |